United States Patent [19]

Castine

[11] 4,152,022
[45] May 1, 1979

[54] OPERATOR'S CAB FOR OFF-HIGHWAY VEHICLE

[75] Inventor: Donald G. Castine, Amherst, N.Y.

[73] Assignee: Eaton Yale Ltd., Canada

[21] Appl. No.: 829,395

[22] Filed: Aug. 31, 1977

[51] Int. Cl.² ............................................. B60J 5/00
[52] U.S. Cl. .................................. 296/146; 296/190; 49/401
[58] Field of Search ................... 296/28 R, 28 C, 146; 49/401

[56] References Cited

U.S. PATENT DOCUMENTS 2,970,347  2/1961  Massopast ............................. 49/401
4,017,117  4/1977  Eggert ................................. 296/146

FOREIGN PATENT DOCUMENTS 381539  5/1962  Switzerland ............................ 296/146

*Primary Examiner*—Philip Goodman
*Attorney, Agent, or Firm*—D. Wood; R. J. McCloskey

[57] ABSTRACT

A cab intended for use as the operator's cab of a tree harvester vehicle has an access door in the leading surface of the cab. The cab door frame, and the access door, are defined by square tubes which are turned 45° with respect to the plane of the door opening to define oblique interfaces between the door edge faces and the door opening faces.

6 Claims, 6 Drawing Figures

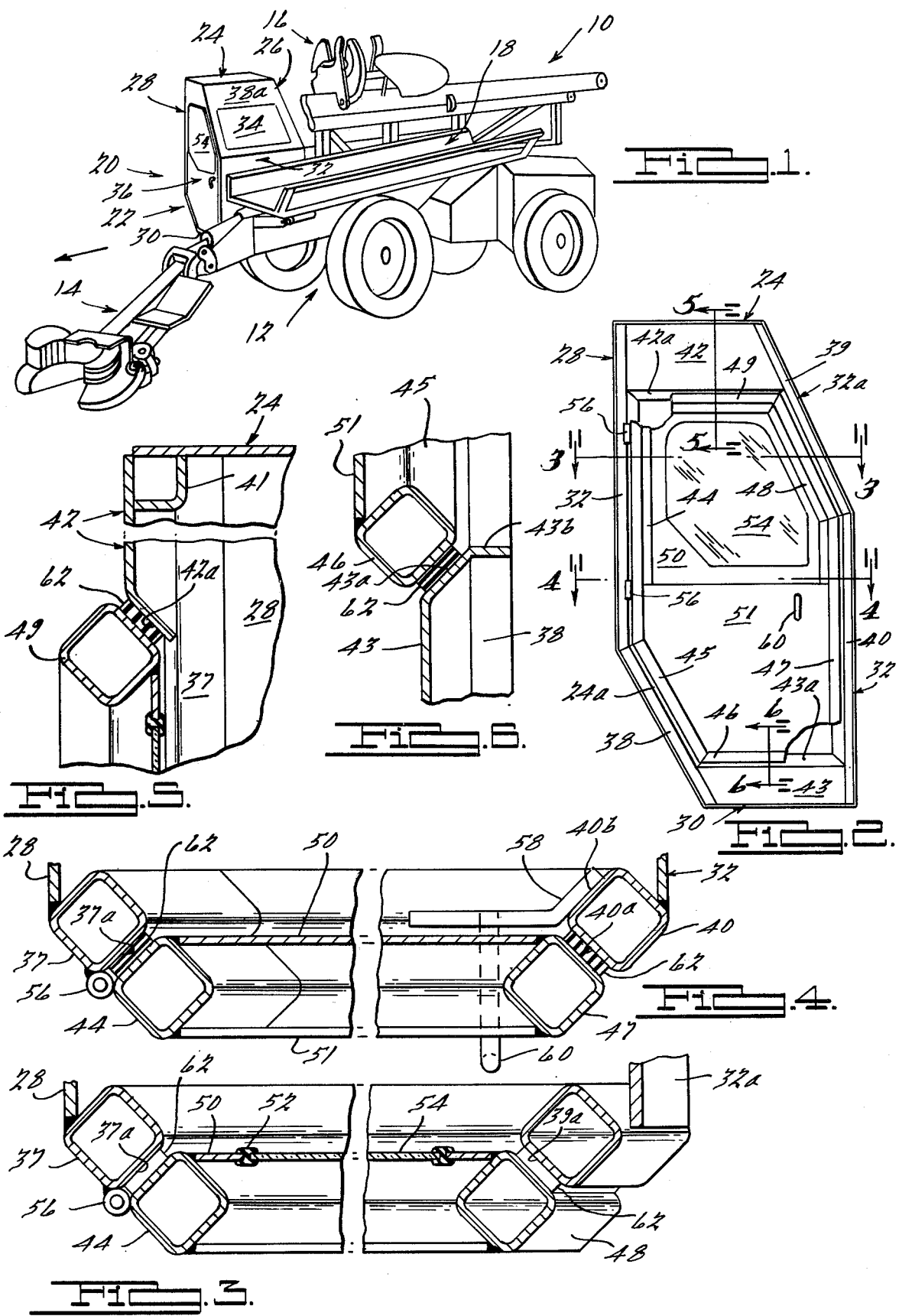

OPERATOR'S CAB FOR OFF-HIGHWAY VEHICLE

BACKGROUND OF THE INVENTION

This invention relates to cab constructions. More particularly, it relates to an improved construction for a cab intended for use as the operator's cab of an off-highway vehicle.

The design of an operator's cab for an off-highway vehicle—especially a vehicle intended for forestry use—presents several challenges not encountered in vehicles intended primarily for on-highway usage. Specifically, such cabs require extremely effective door seal design because of the weather extremes encountered, and the general lack of in-cab comfort equipment. Further, such cabs require a design that will enable them to move unobstrusively through heavy brush or undergrowth. Still further, such cabs require a design that will maximize the protection afforded the operator upon impact of the cab with heavy obstacles such as fallen logs. This latter requirement becomes even more critical when the cab, such as in the case of an operator's cab for a tree harvester vehicle, has an access door in the leading surface of the cab.

SUMMARY OF THE INVENTION

It is an object of the present invention to provide an improved construction for an operator's cab for an off-highway vehicle.

It is a more specific object to provide an operator's cab for a forestry vehicle which has extremely effective weather sealing characteristics.

Another object is to provide an operator's cab for a forestry vehicle which will allow the cab to move unobtrusively through underbrush.

A further object is to provide, in a cab intended for use as the operator's cab of an off-highway vehicle and having an access door in the front of the cab, an improved cab construction which will be highly resistant to intrusion of the access door into the operator's compartment upon frontal impact.

The invention cab construction is particularly effective in a cab of the type having an access door in the leading surface of the cab. According to the invention, the two jamb faces of the door opening (and/or the sill and transom faces of the opening) lie in planes which are oblique with respect to the plane of the door opening and which converge toward the trailing surface of the cab, and the edge faces of the access door confronting the jamb faces of the door opening (and/or the sill and transom faces of the opening) are complimentarily oblique.

In the disclosed embodiment, the door edge faces and the confronting door opening faces are fabricated of square tubes, and the tubes are rotated 45° with respect to the plane of the door opening to define oblique interfaces therebetween. This construction provides improved weather sealing for the access door; provides chamfered vertical frontal edges for the cab to facilitate movement through thick brush and undercover; and provides a door construction which is highly resistant to intrusion of the door into the operator's compartment upon frontal impact with fallen logs or the like since such impact generates a force vector in a direction perpendicular to the door/door opening interface to effectively increase the door closing force and transfer the impact loading to the cab frame.

These and other objects, features and advantages of the invention will be apparent from the description of the preferred embodiment, and by reference to the accompanying drawing.

BRIEF DESCRIPTION OF THE DRAWING

FIG. 1 is a perspective view of a construction vehicle embodying an operator's cab according to the invention;

FIG. 2 is a front elevational view of the operator's cab seen in FIG. 1; and

FIGS. 3, 4, 5, and 6 are cross sectional views taken on lines 3—3, 4—4, 5—5, and 6—6 of FIG. 2.

DESCRIPTION OF THE PREFERRED EMBODIMENT

The construction vehicle 10 shown in FIG. 1 is of the type commonly referred to as a treelength harvester. Harvester 10 includes a propulsion carriage 12; a clamping and shearing assembly 14 which clamps a tree at the base and shears it clean at ground level below the clamped portion; a delimbing assembly 16 (partially broken away) which receives the sheared tree and travels the length of the tree to remove all limbs; a bunk or hopper 18 which receives the delimbed trees and, upon accumulation of a grapple size load, tilts to drop the load for subsequent pickup by a grapple vehicle; and an operator's cab 20 disposed essentially at the right front corner of the vehicle, over and forwardly of the right front wheel.

Cab 20 is of generally box-like configuration and includes a front side 22, top side 24, rear side 26, outboard side 28, bottom side 30, and inboard side 32. Inboard side 32 includes an angled upper portion 32a which mounts a window 34. An access door 36 is provided in front side 22. Front side 22, considering the direction of forward vehicle travel as shown by the arrow in FIG. 1, constitutes the leading surface of the cab.

Cab 20 is constructed generally as a unitary weldment comprising a cage or frame structure overlaid with heavy gauge skin panels. As best seen in FIG. 2, the frame structure for cab front side 22 includes a vertically disposed tube 22 forming the upper left jamb of the opening for access door 36; an angled tube 24 butt welded at its upper end to the lower end of tube 22 to form the lower left jamb; an angled tube 26 forming the upper right jamb; a vertically disposed tube 28 butt welded at its upper end to the lower end of tube 26 to form the lower right jamb; and an angle iron 30 weldably interconnecting the upper ends of tubes 22 and 26. Tubes 22, 24, 26, and 28 are of square cross section (FIGS. 3–6) and are rotated 45° with respect to the plane of the door opening.

Front side 22 is completely by an upper skin or plate 32 and a lower plate 34. Upper plate 32 is welded along its left and right edges to the forward edges of tubes 22 and 26, respectively, and bent inwardly 45° along its lower edge to define the transom face 32a of the door opening. Lower plate 34 is welded along its left and right edges to the forward edges of tubes 24 and 28, respectively, and twice bent inwardly 45° adjacent its upper edge to define a beveled sill face 34a and a horizontal face 34b. The sill and transom faces of the door opening are thus defined respectively by the inwardly angled faces 32a and 34a, respectively, of the upper and lower plates 32 and 34; the left jamb face of the door opening is defined by side faces 22a and 24a of tubes 22 and 24; and the right jamb face of the door opening is defined by side faces 26a and 28a of tubes 26 and 28. It will be seen that sill and transom faces 32a and 34a lie in planes which are oblique with respect to the plane of the door opening (specifically, rotated 45° with respect to that plane) and which converge toward the rear side of the cab. Similarly, the jamb faces of the door opening, or at least jamb faces 22a and 28a, lie in planes which are oblique (45°) with respect to the plane of the door opening and which converge toward the rear side of the cab.

The frame of door 36 is formed entirely of tube stock similar to that employed in the frame structure of cab front side 22. Specifically, the door frame includes a generally vertically extending tube 36; an angled tube 38 butt welded at its upper end to the lower end of tube 36; a lower lateral tube 40 butt welded at its left end (as viewed in FIG. 2) to the lower end of tube 38; a generally vertically extending tube 42 butt welded at its lower end to the right end of tube 40; an angled tube 44 butt welded at its lower end to the upper end of tube 42; and an upper lateral tube 46 butt welded at its right end to the upper end of tube 44 and at its left end to the upper end of tube 36. Tubes 36, 38, 40, 42, 44, and 46 (like door opening tubes 22, 24, 26, and 28) are of square cross section and are rotated 45° with respect to the plane of the door. Tubes 36–46 thus present, in combination, door edge faces which are respectively complimentary to the jamb, sill and transom faces constituting the door opening.

Door 36 is completely by an upper skin or plate 48 and a lower skin or plate 50.

Upper plate 48 is welded along its left edge to the rear edge of tube 36; along its upper edge to the rear edge of tube 46; and along its right edge to the rear edge of tubes 44 and 42. A cutout in plate 48 receives a sealing gasket 52 which in turn receives a window 54.

Lower plate 50 is welded along its left edge to the forward edge of tubes 36 and 38; along its lower edge to the forward edge of tube 40; and along its right edge to the forward edge of tube 42.

Upper plate 48 extends substantially half way down the door, and lower plate 50 extends substantially half way up the door. Their respective lower and upper edges therefore substantially coincide when viewed in the front elevation of FIG. 2.

Hinges 56 pivotally secure door 36 in the door opening, and a suitable latch member 58 (FIG. 4), activated by a handle 60, cammingly engages the rearward inboard face 28b of tube 28 to releasably latch the door in its shut position. Weather stripping 62, of suitable resilient composition, extends completely around the door opening to provide a weather tight seal with the door in its latched position.

The described angled or oblique interface of the door and door opening provides several important advantages. Specifically, (1) the weatherstripping between the door and door opening is inherently and positively compressed as the door is shut, thereby providing a superior weather seal;

(2) the vertical edges or corners of the front of the cab are chamfered (FIGS. 3 and 4) to effectively deflect brush so that the brush, rather than piling up in front of the cab, tends to slip unobtrusively around the cab; and (3) the door construction is highly resistant to intrusion of the door into the operator's compartment upon frontal impact with fallen logs or the like since such frontal impact generates a force vector in a direction perpendicular to the door/door opening interface to effectively increase the door closing force and transfer the impact loading to the cab frame.

While a preferred embodiment of the invention has been illustrated and described in detail, it will be apparent that various changes and modifications may be made in the described embodiment without departing from the scope or spirit of the invention.

I claim:

1. In a cab of the type intended for use as the operator's cab of an off-highway vehicle and having an access door in the leading surface of the cab, the improvement wherein
   A. the opening in the leading surface of the cab for receiving said door is defined by a first pair of generally vertically extending, laterally spaced faces defining the jamb faces of said opening and a second pair of generally horizontally extending, vertically spaced surfaces defining the sill and transom faces of said opening;
   B. the door opening faces constituting at least one of said pairs are defined by tubes of polygonal cross section oriented with respect to the plane of the door to present, as one side of the polygon, door opening faces lying in planes which are oblique with respect to the plane of the opening and which converge toward the trailing surface of the cab; and
   C. the edge faces of said door corresponding to the door opening faces constituting said at least one pair are similarly defined by tubes of polygonal cross section oriented with respect to the plane of the door to present, as one side of the polygon, door edge faces complimentary to the similarly defined door opening faces.

2. An improved cab structure according to claim 1 wherein
   D. said at least one pair comprise the jamb faces of said opening.

3. An improved cab structure according to claim 1 wherein
   D. said at least one pair comprise the jamb faces of said opening; and
   E. all of the door edge faces are defined by tubes of polygonal cross section oriented with respect to the plane of the door to present, as one side of the polygon, door edges faces complimentary to the corresponding door opening faces.

4. An improved cab structure according to claim 3 wherein
   F. said tubes are of generally square cross section rotated approximately forty-five degrees with respect to the plane of the door.

5. In a cab of the type intended for use as the operator's cab of an off-highway vehicle and having an access door in the leading surface of the cab, the improvement wherein
   A. the opening in the leading surface of the cab for receiving said door is defined by a first pair of generally vertically extending, laterally spaced faces defining the jamb faces of said opening and a second pair of generally horizontally extending, vertically spaced surfaces defining the sill and transom faces of said opening;
   B. the door opening faces constituting at least one of said pairs are defined by tubes of polygonal cross section oriented with respect to the plane of the door to present, as one side of the polygon, door opening faces lying in planes which are oblique with respect to the plane of the opening and which converge toward the trailing surface of the cab, and to present, as another side of the polygon contiguous to said one side, exterior cab faces lying in planes which are oblique with respect to the plane of the opening and which diverge toward the trailing surface of the cab; and C. the edge faces of said door corresponding to the door opening faces constituting said at least one pair are similarly defined by tubes of polygonal cross section oriented with respect to the plane of the door to present, as one side of the polygon, door edge faces complimentary to the similarly defined door opening faces, and to present, as another side of the polygon contiguous to said one side, exterior door faces lying, with the door closed, generally in the planes of said exterior cab faces whereby to define therewith leading corners of said cab which are chamfered.

6. An improved cab structure according to claim 5 wherein

D. said at least one pair comprise the jamb faces of said opening;

E. all of the door edge faces are defined by tubes of polygonal cross section oriented with respect to the plane of the door to present, as one side of the polygon, door edge faces complimentary to the corresponding door opening faces; and F. said tubes are of generally square cross section rotated approximately 45° with respect to the plane of the door.

* * * * *